UNITED STATES PATENT OFFICE.

WILLIAM ERASTUS WILLIAMS, OF CHICAGO, ILLINOIS.

METHOD OF PREPARING FOOD MATERIALS FOR USE.

No. 897,181.  Specification of Letters Patent.  Patented Aug. 25, 1908.

Application filed July 21, 1905. Serial No. 270,729.

*To all whom it may concern:*

Be it known that I, WILLIAM ERASTUS WILLIAMS, a citizen of the United States of America, and a resident of Chicago, county of Cook, and State of Illinois, have invented certain new and useful Improvements in Methods of Preparing Food Materials for Use, of which the following is a specification.

The object of my invention is to provide a method of preparing cereals or the like materials for food in the form of filaments or flakes, that will retain the entire nutritious qualities of the materials and be in a light palatable form for food.

My invention relates to that class of foods such as shredded wheat biscuit, triscuit, and flake foods such as "Malta Vitæ," "Force," and all that class of goods.

Heretofore it has been the practice with all filamentary and flake foods, to first boil or steam the grain and then treat it by cooling, drying and other methods, and then shredding or flaking the grain. The boiling or steaming of the grain produces considerable change in the chemical quality of the grain, and there escapes from the grain to the water a number of the nutritious soluble elements, grain wheat for instance that has been boiled and then allowed to become well dried becomes slightly translucent, very hard, brittle, and somewhat in appearance and behavior like cakes of dry glue, and it is then almost tasteless. The mealy rich flavor of the raw wheat has disappeared and consequently much of the nutritious value has thereby either escaped to the water or been otherwise lost. Again it is desirable for some foods to sprout or malt the grain in order to get the valuable change effected thereby, such malted grain when boiled or steamed gives over to the liquor its principal nutritious elements and hence the flakes or filaments then produced have lost most of their value. In the ordinary methods of making bread out of grain the grain is first ground to flour and then water and seasoning and leavening matter is added, and then it is baked; thus all the water that is put with the grain or flour remains with the bread and only escapes by evaporation and none of it leaves the flour or bread as a liquor to carry off the soluble matter, but that method of making bread and food stuffs requires the leavening matter in order to make the bread light and palatable and the leavening matter is an impurity and it produces a detrimental chemical change in the material of the bread or food.

With my invention I am able to produce a palatable light food out of almost any grain or material that can be worked up into a pasty condition and none of the soluble materials are allowed to escape.

Ordinary grains, food vegetables, in their natural state in whole form, may be placed in water of not too high a temperature a short or considerable time, and then dried without appreciable injury or chemical change, but the moment that the whole berry or natural cellular form is broken either by grinding, crushing or by heat or other methods, and it is then subjected to water a change immediately takes place and the original natural chemical condition cannot be restored by drying and hence the steps of preparing the food which is to retain the entire natural elements of the grain or vegetable must from the commencement of the first breaking of the cells proceed continuously to the finished product without delays, repeating, relay treatments, which are almost impossible to avoid with the cooking process.

The apparatus I prefer to use in the treatment of my grains or materials is composed of a series of finely circumferentially grooved rolls. But any suitable shredding flake or filament producing machines or apparatus may be used. I prefer to arrange the rolls in sets one set above the other, and as the material passes through one set of rolls it falls directly to the next and so on, but any other suitable arrangement may be used or the material after passing the rolls may be retained until a small mass shall have accumulated and then be passed through the rolls again and so on. The grooves of the last rolls should be quite small and be the requisite size for the filament of the finished product.

I prefer to prepare the grain or vegetable in its whole form by soaking it in water a sufficient time so that there will be held by absorption on the exterior of the kernels or by the spaces in the mass of kernels or into the body of the kernels themselves a sufficient amount of entrained water to produce at the proper stage of reduction the puddling or pasty effect desired to produce the filamentary or flaky product. The grain or vegetable material supplied with the requisite amount of moisture as above described, is then passed through the rolls or shredding devices, and the effect of the first break is to cause the surplus or unabsorbed water to spread itself partly in contact with the interior portions of the material that are now exposed by the breaking action, the second and subsequent passes continue the same action until the water carried by the material at the start is homogeneously mixed with the entire product.

The character of the material is progressively changed in repeatedly passing it through rolls in the presence of moisture, the particles of course rubbing upon each other under somewhat high pressure and the moisture being more and more perfectly distributed through even the most minute portions of the material, until it has sufficient tenacity or cohesiveness to be worked into flakes or filaments although absolutely uncooked. If in this new condition, it be simply baked it is light, highly frangible, and as free from the somewhat horn-like appearance of dried paste as it is from toughness. The change in the character of the material renders it capable of forming, in finally passing through the rolls, continuous shreds or filaments, while after passing for the first time through the same or similar rolls it was delivered as a partially granular or meal-like mass. The change occurring is of course the same whether or not the material be finally worked to thread-like form.

The passing of the material through the apparatus in connection with the water as above described macerates the hull, the germ, and all other parts together into a homogeneous mass and after the material has passed the apparatus a sufficient number of times it comes out threads, filaments, or flakes of a homogeneous character, which are then put into an oven and baked which produces a product, which has every element of the grain with all its flavor without any of the coarse harshness observable by other methods of preparation. Instead of soaking the grain prior to the treatment by the apparatus, it may be fed dry directly to the apparatus and the water supplied by sprays, drops or jets, as it goes through the apparatus.

Club wheat such as is used to make flake food can be taken dry and by the method last above mentioned passed through the grooved rollers, three times when it will appear as beautiful homogeneous shreds, which when baked have a creamy, mealy, delicious flavor, making a food that is palatable when dry, and it makes up excellently, with creams gravies and all sorts of dishes combined with meats, or other articles. Ordinary dry shelled corn with the husk or outer bran coating on in its natural state, can be passed through the rolls a plurality of times in connection with the proper amount of moisture, and be made to come out homogeneous beautiful filaments, which when baked, make delicious corn filaments having the same general properties as above described for wheat, but for corn it requires about three times the amount of treatment required for the wheat. Oats and barley dry with the hulls on in the natural state may be passed through the same as the corn, and thereby make a product of homogeneous character made up of the entire kernel, husk and all, the husk disappearing in the general mass of the material, undiscernible with the naked eye, and thereby making a fine palatable food exceptionally desirable for persons afflicted with alimentary troubles.

What I claim is.

1. The method of preparing cereals and the like naturally dry food materials for use which consists in repeatedly passing the uncooked material, in the presence of moisture, through devices adapted to press it into distinct masses of slight cross sectional area.

2. The method of preparing cereals and the like naturally dry food materials for use which consists in repeatedly passing the natural material in an uncooked state and in the presence of moisture, through devices adapted to press it into masses of slight cross sectional area, and cooking the product.

3. The method of preparing cereals and the like naturally dry food material for use which consists in repeatedly passing the raw material through shredding devices, supplying moisture during the shredding, and baking the product.

4. The method of preparing naturally dry food materials, such as cereals, which consists in repeatedly passing the material in its natural raw state and in the presence of moisture, through devices adapted to press it into distinct masses of slight cross-sectional area.

Signed at Chicago this 14th day of June 1904.

WILLIAM ERASTUS WILLIAMS.

Witnesses:
AXEL AKERHOLM,
W. J. DOWNEY.